Jan. 28, 1969     D. A. GUNTHER     3,424,548
PROCESS AND APPARATUS FOR REMOVING
AMINES FROM STEAM VAPORS
Filed Dec. 30, 1965
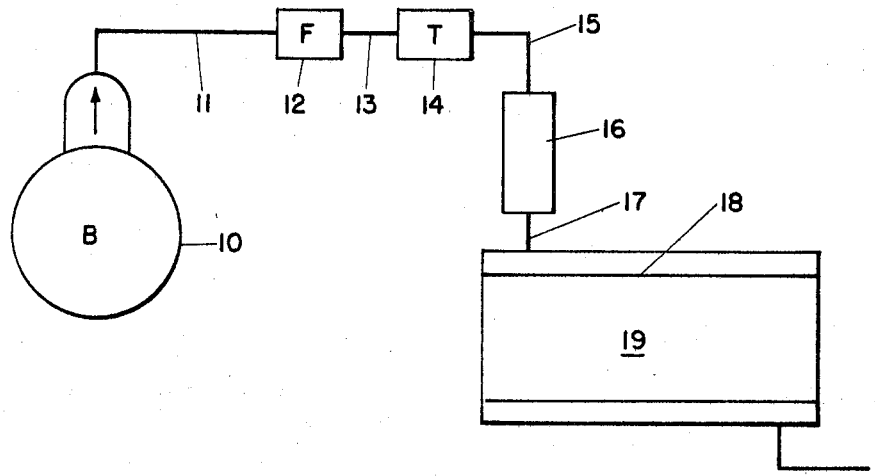
INVENTOR.
Donald A. Gunther
BY
Charles L. Lauerbach
atty

United States Patent Office

3,424,548
Patented Jan. 28, 1969

3,424,548
PROCESS AND APPARATUS FOR REMOVING
AMINES FROM STEAM VAPORS
Donald A. Gunther, Erie, Pa., assignor to American
Sterilizer Company, Erie, Pa., a corporation of
Pennsylvania
Filed Dec. 30, 1965, Ser. No. 518,971
U.S. Cl. 21—94          4 Claims
Int. Cl. A61l 3/00

This invention relates to the separation of materials and, more particularly, to the removal of amines from vapors, particularly, steam.

It is common practice to add certain organic amines to steam generating systems so that these amines volatilize with the water as an azeotropic mixture and thereby reduce corrosion in the steam lines and equipment. Steam treated with such amines is objectionable in many applications, such as, for example, in the use in sterilizers, food processing procedures, and for feedback distillation systems.

Amines in this form are ionic and it has been discovered that they can be removed from condensate by standard ion exchange techniques by means of resins; however, the nature of the common synthetic ion exchange resins are such that amine removal cannot be performed on pressurized steam in the vapor phase due to the heat sensitivity of the resins. It has been discovered, however, that heat resistant inorganic ion exchange crystals, based on certain hydrous oxides such as the hydrous oxides of phosphorous, tungsten and molybdenum, will effectively remove these amines from saturated steam in the vapor phase. Thus, an in-line steam purification apparatus is operable at high temperature and pressure.

The system disclosed herein may consist of a metallic pressure cartridge which may be in the form of a cylinder; for example, constructed of stainless steel or some other resistant material and connected in series with the available steam supply. This cylinder would be designed so that the steam would enter the top of the cylinder and flow down through the resin and out a convenient outlet. This resin would be of the inorganic, hydrous oxide type with cationic properties such as zirconium phosphate, zirconium tungstate, and the like, so as to be capable of adsorbing the volatile amines from the saturated steam. Depending upon the nature of the steam supply, mechanical filters and/or standard steam separators would be placed in-line ahead of the ion exchange resin to prepurify the steam. This system could be set up to be capable of purifying steam up to 1,200 pounds per square inch gauge. It is understood that regulators, valves, and other standard components may be required and used in the usual manner to most efficiently expedite the purification process as will appear hereinafter by way of a specific example.

It is, accordingly, an object of the present invention to provide an improved method of removing amines from steam.

Another object of the invention is to provide an improved method for removing amines from vapor.

Still another object of the invention is to provide an improved apparatus, including a cartridge containing hydrous oxides, for removing amines from steam and like vapors.

With the above and other objects in view, the invention comprises the processes set forth in the specification, drawing, and recited in the appended claims. The invention will be better understood from a reference to the drawing and detailed specification wherein:

The figure of drawing diagrammatically shows an apparatus for removing amines from steam according to the invention.

Now with more particular reference to the drawing, the diagram shows a boiler 10 connected through line 11 to a filter 12, through line 13 to a trap 14, and by way of line 15 to cartridge 16, thence through line 17 to the sterilizer 18 which has a chamber 19. The sterilizer may be any of the well known sterilizers such as, for example, that shown in Patent No. 2,613,130 and is indicated as an illustration of a specific example of the method in which this invention may be utilized.

The cartridge 16 may be provided with an external shell of stainless steel or the like and it has an inlet at the top and an outlet at the bottom as indicated. The hydrous oxides in the form of zirconium phosphate, zirconium tungstate, titanium phosphate, and zirconium molybdate can be placed in the cartridge 16 in crystalline form. The hydrous oxides indicated may be converted into operative materials that are compounds of thorium, titanium, and zirconium or other insoluble metal salts used in the particular application.

In operation, the steam supplied by the boiler would pass through conventional filters, traps, etc., such as 12 and 14 to cartridge 16 which will all be connected in series with the sterilizer 19. Before the steam was used in a particular process, for example, in the sterilizer 18, it would be passed through the cartridge 16 and the amines removed therefrom in cartridge 16, as aforesaid.

Cartridge 16 could be replaced along with fresh hydrous oxides therein or the hydrous oxides could be replished or replaced from time to time as required.

The foregoing specification sets forth the invention in its preferred practical forms but the process disclosed is capable of modification within a range of equivalents without departing from the invention which is to be understood is broadly novel as is commensurate with the appended claims.

The embodiments of the invention in which an exclusive property or privilege is claimed are defined as follows:

1. A method of removing amines from steam in the vapor phase comprising the step of bringing the steam into contact with a hydrous oxide material.

2. A method of removing amines from steam in the vapor phase comprising the step of bringing the steam into contact with a material selected from the group consisting of the hydrous oxides of phosphorous, tungsten and molybdenum; the phosphorous, tungsten and molybdenum being in the anion of the hydrous oxide.

3. An apparatus for removing amines from steam comprising a source of steam and a repository for steam, a cartridge consisting of a cartridge body having an inlet and outlet for said steam, and means connecting said source of steam, said cartridge, and said repository in series with each other with said cartridge positioned between said source and said repository, said cartridge containing a material selected from the group consisting of the hydrous forms of zirconium tungstate, zirconium phosphate, and titanium phosphate and being disposed in fluid flow relation with said steam.

4. A steam sterilizing system comprising a source of steam, a sterilizing chamber having means to admit said steam from said source of steam to the inside of said sterilizing chamber, means connecting said source of steam to said sterilizing chamber, and means connected in series with said source of steam and said means to connect said steam to said sterilizing chamber to remove amines from said steam, said means to remove amines comprising a material selected from the group consisting of the hydrous forms of zirconium phosphate, zirconium tungstate, and titanium phosphate and being disposed in fluid flow relation with said steam.

References Cited

UNITED STATES PATENTS

| 2,049,608 | 8/1936 | Forrester | 55—74 |
| 3,056,647 | 10/1962 | Amphlett | 23—139 XR |
| 3,332,737 | 7/1967 | Kraus | 210—24 XR |
| 3,337,451 | 8/1967 | Calmon | 210—24 |
| 3,382,034 | 5/1968 | Kraus | 210—24 XR |

MORRIS O. WOLK, *Primary Examiner.*

BARRY S. RICHMAN, *Assistant Examiner.*

U.S. Cl. X.R.

21—56, 103; 55—74, 387